(12) United States Patent
Jing

(10) Patent No.: US 12,397,536 B2
(45) Date of Patent: Aug. 26, 2025

(54) FILM LAMINATING APPARATUS

(71) Applicant: SHENZHEN CHINA STAR OPTOELECTRONICS SEMICONDUCTOR DISPLAY TECHNOLOGY CO., LTD., Shenzhen (CN)

(72) Inventor: Xiaohong Jing, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/622,750

(22) PCT Filed: Dec. 22, 2021

(86) PCT No.: PCT/CN2021/140605
§ 371 (c)(1),
(2) Date: Dec. 24, 2021

(87) PCT Pub. No.: WO2023/103100
PCT Pub. Date: Jun. 15, 2023

(65) Prior Publication Data
US 2024/0034042 A1  Feb. 1, 2024

(30) Foreign Application Priority Data

Dec. 9, 2021 (CN) .......................... 202111501355.5

(51) Int. Cl.
*B32B 37/00* (2006.01)
*B32B 41/00* (2006.01)

(52) U.S. Cl.
CPC .......... *B32B 37/0053* (2013.01); *B32B 41/00* (2013.01); *B32B 2041/04* (2013.01)

(58) Field of Classification Search
CPC . B32B 37/0053; B32B 41/00; B32B 2041/04; B32B 37/003; B32B 37/10
See application file for complete search history.

(56) References Cited

U.S. PATENT DOCUMENTS 7,857,029 B2 * 12/2010 Yamamoto ........ H01L 21/67132
156/941
2019/0363300 A1  11/2019 Kishimoto et al.

FOREIGN PATENT DOCUMENTS

CN  102103987 A  6/2011
CN  107584753 A  1/2018
(Continued)

OTHER PUBLICATIONS

Machine Translation CN 102103987 (Year: 2011).*

*Primary Examiner* — George R Koch
*Assistant Examiner* — Christopher C Caillouet
(74) *Attorney, Agent, or Firm* — The Roy Gross Law Firm, LLC; Roy D. Gross

(57) ABSTRACT

A film laminating apparatus is provided. The film laminating apparatus includes a roller and a platform arranged oppositely, and a blowing member. A first gap is defined between the roller and the platform. The flexible panel and the laminating film are interposed between the roller and the platform via the first gap. The flexible panel includes a display portion and a bonding portion, and a step difference is existed between the display portion and bonding portion such that a second gap is formed between the bonding portion and the platform. An air outlet of the blowing member is in communication with the second gap. The blowing member is configured to generate a positive pressure at the second gap to support the bonding portion of the flexible panel.

19 Claims, 3 Drawing Sheets

(56) References Cited

FOREIGN PATENT DOCUMENTS

| CN | 108262941 A | 7/2018 |
|---|---|---|
| CN | 108511603 A | 9/2018 |
| CN | 207895780 U | 9/2018 |
| CN | 208140976 U | 11/2018 |
| CN | 109285967 A | 1/2019 |
| CN | 109773696 A | 5/2019 |
| CN | 110992837 A | 4/2020 |
| CN | 111443508 A | 7/2020 |
| CN | 211943891 U | 11/2020 |

\* cited by examiner

FILM LAMINATING APPARATUS

CROSS REFERENCE TO RELATED APPLICATIONS

This application is a National Phase of PCT Patent Application No. PCT/CN2021/140605 having International filing date of Dec. 22, 2021, which claims the benefit of priority of Chinese Application No. 202111501355.5 filed on Dec. 9, 2021. The contents of the above applications are all incorporated by reference as if fully set forth herein in their entirety.

FIELD OF INVENTION

The present disclosure relates to the technical field of manufacturing a apparatus, in particular to a film laminating apparatus.

BACKGROUND OF INVENTION

As display technologies are continuously developing, flexible display panels have become more and more widely used. Among them, in a manufacturing process of the flexible OLED (organic light-emitting diode) panel, a rigid glass substrate is usually used as a support to manufacture each film layer of the OLED panel. Then the glass substrate is peeled off. As shown in both FIG. 1 and FIG. 2, when the OLED panel 1000 flows to the module section, a size of part of film layers 1002 (such as thin film encapsulation layer, polarizer, etc.) on the front side of the OLED panel 1000 is smaller than a flexible substrate 1001 of the OLED panel. Therefore, a step difference is formed between a display portion 1000A and a bonding portion 1000B of the OLED panel 1000. When the glass substrate is peeled from the flexible substrate 1001, the back plate film 2000 (BP) have to be laminated to the back of the flexible substrate 1001 as a film material stiffness support. Due to the existence of the step difference, the bonding portion 1000B of the OLED panel 1000 is unsupported, which causes the formation of laminating bubbles 3000 at the position corresponding to the step difference after the back plate film 2000 is laminated, which affects product quality and process yield.

Therefore, the existing technology has defeats, which need to be solved urgently.

SUMMARY OF INVENTION

Technical Problems

The present disclosure provides a film laminating apparatus, which can solve the problem of laminating bubbles caused by a step difference between the display portion and the bonding portion of the flexible panel in the back plate film lamination process in the prior art.

Technical Solutions

In order to solve the above-mentioned problems, the technical solution provided by the present disclosure is as follows:

An embodiment of the present disclosure provides a film laminating apparatus for laminating a flexible panel and a laminating film. The film laminating apparatus comprises a roller and a platform arranged oppositely, and a blowing member;

wherein the platform is configured to support the flexible panel and the laminating film, a first gap is defined between the roller and the platform, the flexible panel and the laminating film are interposed between the roller and the platform via the first gap, the laminating film is laminated on a surface of the flexible panel by rolling the roller;

wherein the laminating film is disposed on a side of the flexible panel away from the platform, the flexible panel comprises a display portion and a bonding portion which is disposed on a side of the display portion, and a second gap is defined between the bonding portion of the flexible panel and the platform; and wherein an air outlet of the blowing member is in communication with the second gap, and the blowing member is configured to generate a positive pressure at the second gap to support the bonding portion of the flexible panel.

Alternatively, in some embodiments of the present disclosure, the platform is provided with a plurality of blowing holes at a position corresponding to the bonding portion, and the blowing holes are in communication with the air outlet of the blowing member.

Alternatively, in some embodiments of the present disclosure, the platform comprises a first platform portion and a second platform portion which is positioned on a side of the first platform portion, and the display portion of the flexible panel is disposed with respect to the first platform portion, the bonding portion of the flexible panel is disposed with respect to the second platform portion; wherein a plurality of the blowing holes are defined by the second platform portion and penetrate through the second platform portion.

Alternatively, in some embodiments of the present disclosure, the roller is connected to a first driving member, and the first driving member is configured to drive the roller to roll along a direction from the first platform portion to the second platform portion.

Alternatively, in some embodiments of the present disclosure, when the roller rolls to the bonding portion, the blowing member is configured to generate the positive pressure at the second gap, and a position of the air outlet of the blowing member is synchronized with a laminating position of the roller on the laminating film.

Alternatively, in some embodiments of the present disclosure, the film laminating apparatus further comprises a detecting member, the detecting member is positioned at an edge of the first platform portion close to the second platform portion, or the detecting member is positioned at a junction of the first platform portion and the second platform portion, and the detecting member is configured to detect whether the roller reaches a designated position.

Alternatively, in some embodiments of the present disclosure, the detecting member is an infrared sensor and a direction of the emitted infrared light emitted by the infrared sensor is perpendicular to a surface of the first platform portion for contacting with the flexible panel.

Alternatively, in some embodiments of the present disclosure, the film laminating apparatus further comprises a controller which controls initiation and termination of the first driving member and the blowing member; when the detecting member detects that the roller reaches the designated position, the blowing member is initiated under control of the controller.

Alternatively, in some embodiments of the present disclosure, the blowing holes are arranged at intervals along a rolling direction of the roller, and the blowing member comprises a plurality of air knives, and the air knives are positioned with respect to the blowing holes.

Alternatively, in some embodiments of the present disclosure, when the detecting member detects that the roller reaches the designated position, the controller controls sequential initiation of the air knives along the rolling direction of the roller, and an initiation speed of the air knives is synchronized with a rolling speed of the roller.

Alternatively, in some embodiments of the present disclosure, the second platform portion comprises a platform body, a hollow area, and a plurality of baffles, the baffles are positioned in the hollow area perpendicular to a rolling direction of the roller, and the baffles are rotatably connected to the platform body; and wherein a third gap which is defined between adjacent two of the baffles is the blowing hole.

Alternatively, in some embodiments of the present disclosure, each of the baffles is rotatably connected to the platform body via a shaft, and the baffles rotate with the rotation of the shafts.

Alternatively, in some embodiments of the present disclosure, the film laminating apparatus further comprises a second driving member. Each of the shafts is connected with the second driving member. The second driving member is used for controlling the rotation of each of the shafts. The controller may further be used for controlling the initiation and termination of the second drive member.

Alternatively, in some embodiments of the present disclosure, a shape of the blowing hole may be a slit shape, and an extending direction of the slit is perpendicular to a moving direction of the roller.

Alternatively, in some embodiments of the present disclosure, a surface of the second platform portion facing the flexible panel is a first surface, the second platform portion comprises a platform body and a plurality of hollow areas, and each of the hollow areas is a blowing hole.

wherein the blowing holes penetrate through the second platform portion in a direction perpendicular to the first surface; or the blowing holes penetrate through the second platform along a direction at a predetermined inclination angle to relative the first surface.

Alternatively, in some embodiments of the present disclosure, a plurality of suction holes are defined on the first platform portion and penetrate through the first platform portion, the film laminating apparatus further comprises a plurality of suction members connected to the suction holes, the suction members generate a negative pressure between the first platform portion and the display portion of the flexible panel via the suction holes, so as to suction the flexible panel on the first platform portion.

Alternatively, in some embodiments of the present disclosure, the first platform portion and the second platform portion are an integral structure.

Alternatively, in some embodiments of the present disclosure, the first platform portion and the second platform portion are arranged independently of each other. The second platform portion is movable relative to the first platform portion.

Alternatively, in some embodiments of the present disclosure, the film laminating apparatus further comprises a third driving member. The second platform portion is connected to the third driving member. The third driving member is used for driving the second platform portion to move. The controller can further be used for controlling the initiation and termination of the third driving member.
Beneficial Effects:

Beneficial effects of the present disclosure are that: the film laminating apparatus provided by the present disclosure comprises a roller and a platform arranged oppositely, and a blowing member. The laminating film are interposed between the roller and the platform. A step difference is existed between the display portion and bonding portion such that a second gap is formed between the bonding portion and the platform. In the present disclosure, by providing the blowing member and an air outlet of the blowing member that is in communication with the second gap, the blowing member can generate a positive pressure at the second gap to support the bonding portion of the flexible panel, thereby solving a problem of formation of laminating bubbles caused by the step difference between the display portion and the bonding portion of the flexible panel and increasing product quality and process yield.

DESCRIPTION OF DRAWINGS

In order to more clearly describe the technical solutions in the embodiments of the present disclosure, the following will briefly introduce the accompanying drawings used in the description of the embodiments. Obviously, the accompanying drawings in the following description are only some embodiments of the present disclosure. For those skilled in the art, without creative work, other drawings can be obtained based on these drawings.

DETAILED DESCRIPTION OF PREFERRED EMBODIMENTS

Figure 1:
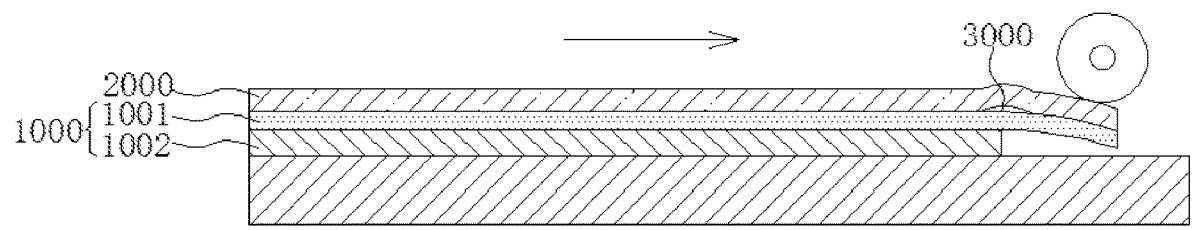
FIG. 1 is a schematic diagram of a lamination process of an OLED panel and a back plate film in the prior art.
Figure 2:
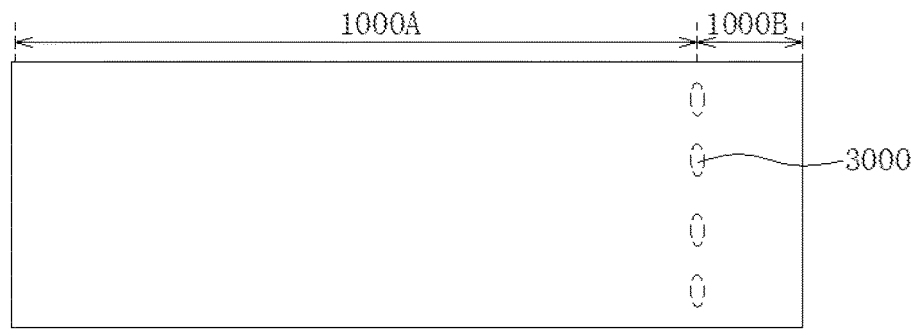
FIG. 2 is a top view diagram of the film layers after the OLED panel and the back plate film are laminated in the prior art.

The technical solutions in the embodiments of the present disclosure will be clearly and completely described below combining with the accompanying drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative work shall fall within the protection scope of the present disclosure. In addition, it should be understood that the specific embodiments described herein are only configured to illustrate and explain the present disclosure, and are not configured to limit the present disclosure. In the present disclosure, if there is no opposite explanation, the used orientation terms, such as "upper" and "lower" generally refer to the upper and lower directions of the apparatus in actual use or working state, and specifically refer to the drawing directions in the drawings, while "inner" and "outer" refer to the contour of the apparatus.

The embodiment of the present disclosure provides a film laminating apparatus, which can solve the problem of formation of laminating bubbles caused by the step difference between the display portion and the bonding portion of the flexible panel during the lamination process of the laminating film in the prior art.

As shown in FIGS. 3-7, an embodiment of the present disclosure provides a film laminating apparatus, which comprises a roller 1 and a platform 2 arranged oppositely, and a blowing member 3. A first gap is defined between the roller 1 and the platform 2. The platform 2 is configured to support the flexible panel 100 and the laminating film 200. In the lamination process of the flexible panel 100 and the laminating film 200, the flexible panel 100 and the laminating film 200 are interposed between the roller 1 and the platform 2 via the first gap. The laminating film 200 is laminated on a surface of the flexible panel 100 by rolling the roller 1.

The laminating film 200 is positioned on a side of the flexible panel 100 which is away from the platform 2. The flexible panel 100 comprises a display portion 100A and a bonding portion 100B positioned on a side of the display portion 100A. A step difference exists between the display portion 100A and the bonding portion 100B, such that a second gap is defined between the bonding portion 100B of the flexible panel 100 and the platform 2. An air outlet of the blowing member 3 communicates with the second gap, and the blowing member 3 is configured to generate a positive pressure at the second gap to support the bonding portion 100B of the flexible panel 100.

By the above-mentioned design, the present disclosure can solve the problem of formation of laminating bubbles caused by the step difference between the display portion and the bonding portion of the flexible panel, thereby increasing product quality and process yield.

The film laminating apparatus of the present disclosure will be described in detail below in conjunction with specific embodiments.

Figure 3:
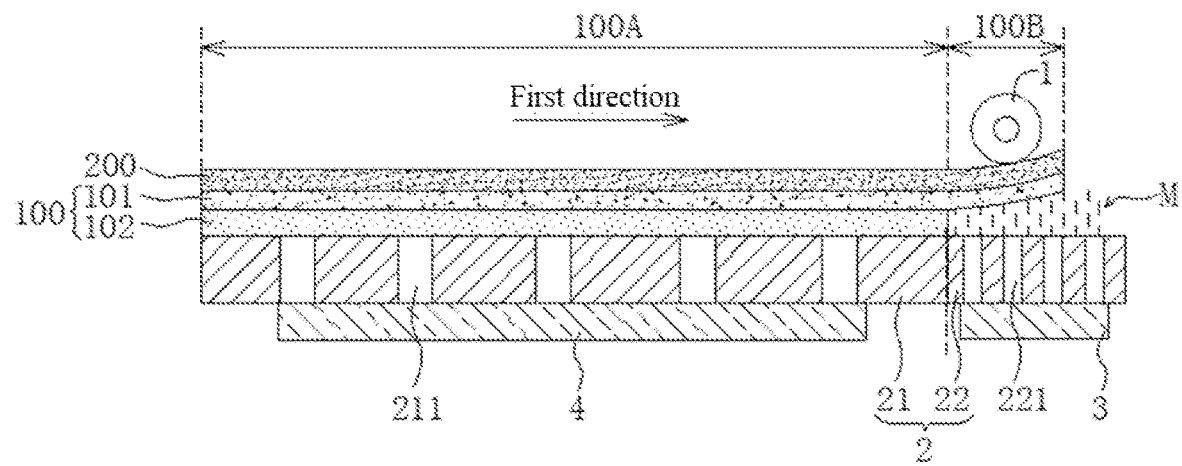
FIG. 3 is a schematic diagram of a lamination process of a flexible panel and a laminating film provided by an embodiment of the present disclosure.

The film laminating apparatus provided in the present embodiment can be used for laminating a flexible panel and a laminating film. Exemplarily, the film laminating apparatus can be used for laminating a flexible panel and a back plate. As shown in FIG. 3, the film laminating apparatus comprises a roller 1 and a platform 2 arranged oppositely. The platform 2 is configured to support the flexible panel 100 to be laminated and the laminating film 200. The roller 1 is arranged in parallel on top of the platform 2. Furthermore, a first gap is defined between the roller 1 and the platform 2. In the lamination process, the flexible panel 100 and the laminating film 200 are interposed between the roller 1 and the platform 2 via the first gap. The laminating film 200 is laminated on the surface of the flexible panel 100 by rolling the roller 1.

The flexible panel 100 comprises a flexible substrate 101 and a functional film layer 102 which is disposed on the flexible substrate 101. The flexible substrate 101 is prepared with driving circuits and connection lines. The functional film layer 102 is a stack of multiple film layers, comprising but not limited to a light-emitting layer, a thin film encapsulation layer, a polarizer, etc. The flexible panel 100 comprises a display portion 100A and a bonding portion 100B which is positioned on a side of the display portion 100A. The area where the functional film layer 102 corresponds to is the display portion 100A, while the area where is not covered by the functional film layer 102 is the bonding portion 100B. In a front side (display surface) of the flexible panel 100, a step difference is defined between the display portion 100A and the bonding portion 100B. The bonding portion 100B is used for bonding to a flexible circuit board or a printed circuit board.

When the flexible panel 100 is placed on the platform 2, the front side of the flexible panel 100 faces toward the platform 2. A back side of the flexible panel 100 is used for bonding to the laminating film 200. Due to the step difference between the display portion 100A and the bonding portion 100B, a second gap is formed between the bonding portion 100B of the flexible panel 100 and the platform 2.

The film laminating apparatus further comprises a blowing member 3. An air outlet of the blowing member 3 is in communication with the second gap. The blowing member 3 is configured to generate a positive pressure at the second gap to support the bonding portion 100B of the flexible panel 100.

Specifically, the platform 2 is provided with a plurality of blowing holes 221 at a position corresponding to the bonding portion 100B. The blowing holes 221 are in communication with the air outlet of the blowing member 3. The blowing member 3 blows air to the bonding portion 100B of the flexible panel 100 via the blowing holes. 221, so that a positive airflow M is formed at the second gap to support the bonding portion 100B of the flexible panel 100. When the roller 1 rolls to the bonding portion 100B of the flexible panel 100, the blowing member 3 is used for generating a positive pressure airflow M at the second gap. A position of the air outlet of the blowing member 3 is synchronized with a laminating position of the roller 1 on the laminating film 200 to formed positive airflow M is configured to support the bonding portion 100B.

In an embodiment, the blowing member 3 may be positioned below the second platform portion 22.

In an embodiment, the platform 2 comprises a first platform portion 21 and a second platform portion 22 positioned on a side of the first platform portion 21. In the present embodiment, the first platform portion 21 and the second platform portion 22 are integrally designed. The display portion 100A of the flexible panel 100 is disposed corresponds to the first platform portion 21. The bonding portion 100B of the flexible panel 100 is disposed corresponds to the second platform portion 22. The second platform portion 22 is evenly provided with a plurality of blowing holes 221 penetrating through the second platform portion 22.

The shape of the blowing hole 221 may be a slit shape. An extending direction of the slit is perpendicular to a moving direction of the roller 1. It may also be a trumpet shape or a duckbill shape arranged at intervals, which is not limited here.

The first platform portion 21 is provided with a plurality of suction holes 211 penetrating through the first platform portion 21. The film laminating apparatus further comprises an adsorption member 4 positioned below the first platform portion 21 and connected (communicating) with a plurality of the adsorption holes 211. The adsorption member 4 generates s a negative pressure between the first platform portion 21 and the display portion 100A of the flexible panel 100 via the adsorption holes 211 to suck and fix the flexible panel 100 on the first platform portion 21.

The film laminating apparatus also comprises a first driving member (not shown) and a detecting member (not shown). The roller 1 is connected to the first driving member. The first driving member is used for driving the roller 1 to roll in a first direction (as shown by an arrow in FIG. 3), the first direction is a direction in which the first platform portion 21 faces toward the second platform portion 22. The first driving member may be an air cylinder or a motor. The detecting member may be positioned at an edge of the first platform portion 21 close to the second platform portion 22, or the detecting member may be positioned at a junction of the first platform portion 21 and the second platform portion 22. The detecting member is used for detecting whether the roller 1 reaches the designated position.

In an embodiment, the detecting member may be an infrared sensor and a direction of the emitted infrared light is perpendicular to a surface of the first platform portion 21 for contacting with the flexible panel 100. When the roller 1 rolls to the top of the infrared sensor, the infrared sensor can detect the roller 1. Certainly, in other embodiments, the detecting member may also be other types of sensors which is no limited herein.

The film laminating apparatus further comprises a controller that controls initiation and termination of the first driving member and the blowing member 3. When the detecting member detects that the roller 1 reaches a designated position, the controller controls the blowing component 3 to initiate. Exemplarily, the designated position may be an edge of the display portion 100A close to the bonding portion 100B, or a junction of the display portion 100A and the bonding portion 100B. The controller can also control an air output of the blowing member 3, so that the air output of the blowing member 3 can be adjusted according to the stiffness of film material of the flexible panel 100.

As shown in FIG. 3, during the lamination process, the flexible panel 100 and a first end of the laminating film 200 (the end of the display portion 100A away from the bonding portion 100B) is interposed between the roller 1 and the platforms 2. The roller 1 rolls in the first direction and presses the laminating film 200 onto the flexible panel 100. Because the first platform portion 21 and the roller 1 can provide a clamping force to the display portion 100A and the laminating film 200, no bubbles are formed when the laminating film 200 is laminated to the display portion 100A. When the detecting member detects that the roller 1 is rolled to a specified position, the controller controls the blowing member 3 to initiate. Meanwhile, the blowing member 3 blows air to the bonding portion 100B via the blowing holes 221. Because a positive airflow M formed at the second gap and the roller 1 can provide a certain clamping force to the bonding portion 100B and the laminating film 200, the junction between the display portion 100A and the bonding portion 100B, and also the bonding portion 100B will not generate bubbles after laminating.

Furthermore, the blowing member 3 may comprise a plurality of subunits. The controller may regionally control the air output of the blowing member 3 according to actual manufacturing process conditions. For example, with the pressing process of the roller 1, the controller may control the subunits of the blowing member 3 at the corresponding position to reduce the air output after being pressed by the roller 1.

Figure 4:
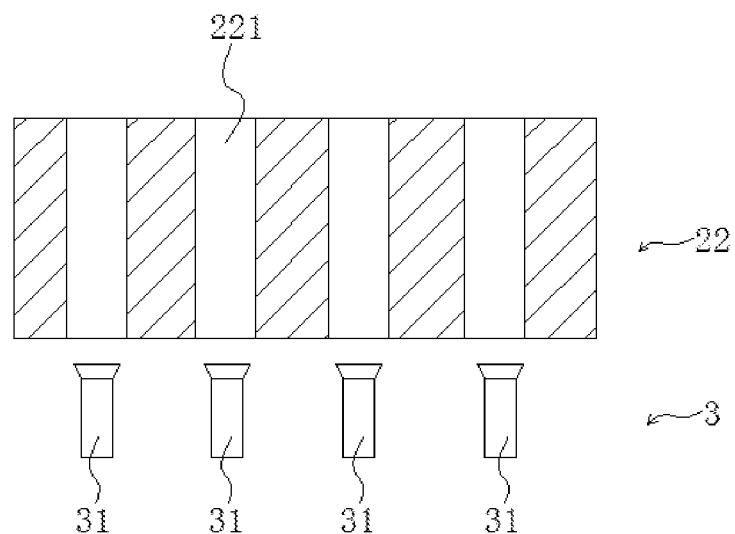
FIG. 4 is a structural schematic diagram of a second platform portion and a blowing member provided by an embodiment of the present disclosure.

In an embodiment, as shown in FIG. 4, a plurality of the blowing holes 221 are arranged at intervals along a rolling direction of the roller 1. The blowing member 3 comprises a plurality of air knives 31. The air knives 31 is provided corresponding to a plurality of the blowing holes 221, and each air knife 31 is connected with the controller. When the detecting member detects that the roller 1 reaches a designated position, the controller controls the air knives 31 to be activated sequentially along the rolling direction of the roller 1. The initiation speed of the air knives 31 is synchronized with the rolling speed of the roller 1, so that the positive airflow blown by the air knife 31 can provide a supporting force for the bonding portion 100B at the pressing position of the roller 1.

In addition, with the pressing process of the roller 1, the controller may control the air knives 31 at the corresponding positions to be sequentially closed along the rolling direction of the roller 1 after being pressed by the roller 1. Because the bonding portion 10B does not need a positive pressure airflow to provide supporting force at the position after being pressed by the roller 1, the risk of "bulging" or "protrusion" that may occur at the corresponding position of the bonding portion 10B after being pressed by the roller 1 is avoided.

Figure 5:
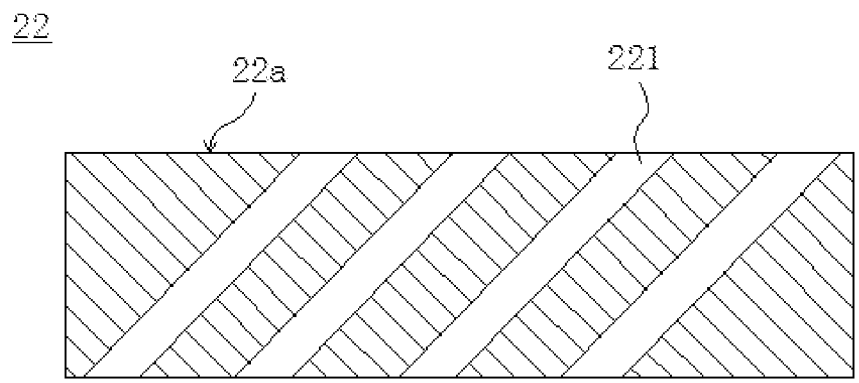
FIG. 5 is a schematic structural diagram of one type of the second platform portion provided by an embodiment of the present disclosure.
Figure 6:
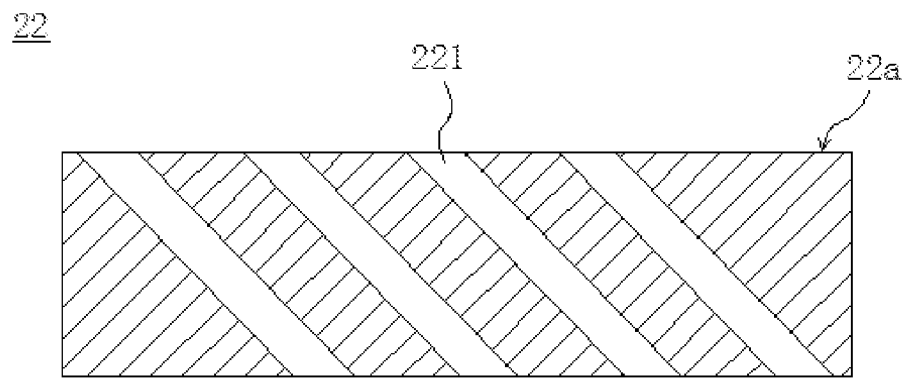
FIG. 6 is a schematic result diagram of the results of another type of the second platform portion provided by an embodiment of the present disclosure.

In an embodiment, as shown in FIG. 5 and FIG. 6, a surface of the second platform portion 22 facing toward the flexible panel 100 is the first surface 22a. The second platform portion 22 comprises a platform body 220 and a plurality of hollow areas. Each of the hollow areas correspondingly forms a blowing hole 221. The blowing holes 221 penetrate through the second platform portion 22 in a direction perpendicular to the first surface 22a. Alternatively, the blowing holes 221 penetrate through the second platform portion 22 along a direction at a predetermined inclination angle relative to the first surface 22a. The predetermined inclination angle is between 30° and 150°. Exemplarily, as shown in FIGS. 5-6, the predetermined inclination angles are 45° and 135°. In the present embodiment, by arranging the blowing holes 221 to penetrate through the second platform portion 22 at different angles, the direction of airflow blowing from the blowing member 3 via the blowing holes 221 is adjusted according to the stiffness of the film material of the flexible panel 100.

Figure 7:
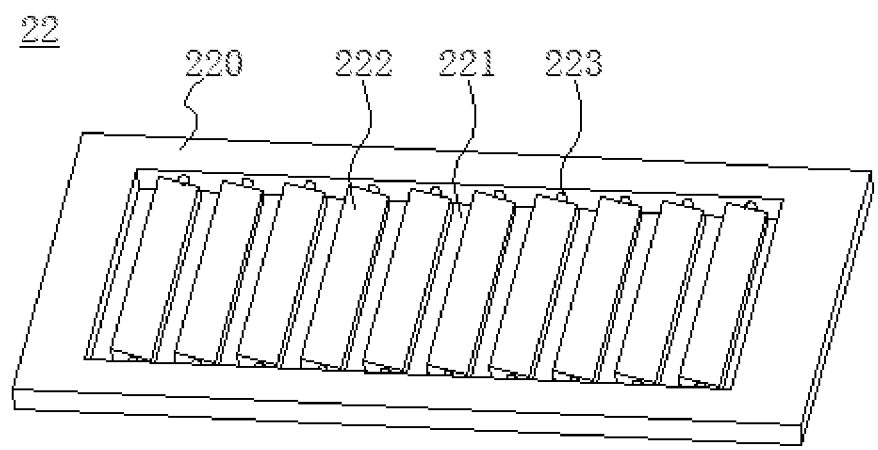
FIG. 7 is a schematic result diagram of yet another type of the second platform portion provided by an embodiment of the present disclosure.

In an embodiment, as shown in FIG. 7, the second platform portion 22 comprises a platform body 220, a hollow area, and a plurality of baffles 222. The baffles 222 are arranged in the hollow area perpendicular to the rolling direction the roller 1. The baffles are rotatably connected to the platform body. A third gap which is defined between adjacent two of the baffles 222 is the blowing hole 221. Specifically, each of the baffles 222 is rotatably connected to the platform body 220 via a shaft 223. The baffles 222 can rotate with the rotation of the shafts 223. The film laminating apparatus further comprises a second driving member. Each of the shafts 223 is connected with the second driving member. The controller can control the initiation and termination of the second drive member, and can individually control the rotation of each of the shafts 223 via the second drive member. Exemplarily, the controller controls the rotation of the shafts 223 so that the airflow blown from the blowing member 3 via the blowing holes 221 forms a sweeping airflow. Specifically, the sweeping airflow moves from the junction of the display portion 100A and the binding portion 100B to the edge of the binding portion 100B away from the side of the display portion 100A. A moving speed of the sweeping airflow is synchronized with the rolling speed of the roller 1, so that the sweeping airflow (positive pressure airflow) can provide a supporting force for the bonding portion 100B at the position pressed by the roller 1. The baffles 222 of the present embodiment form a structure similar to a louver. The rotation of the shafts 223 can be adjusted according to the stiffness of the film material of the flexible panel to flexibly adjust the direction of the air outlet via the blowing holes 221.

In addition, in the present embodiment, the controller can control the shafts 223 to rotate in turn at the corresponding positions after being pressed by the roller 1, so as to drive a surface of the baffle 222 to be parallel to the surface of the second platform portion 22 (22a in FIG. 5), thereby closing the blowing holes 221 at the corresponding position after being pressed by the roller 1.

In an embodiment, the first platform portion 21 and the second platform portion 22 are arranged independently of each other. The film laminating apparatus further comprises a third driving member. The second platform portion 22 is connected to the third driving member. The controller can control the initiation and termination of the third driving member. The third driving member is used for driving the second platform portion 22 to move, so that the second platform portion 22 is movable relative to the first platform portion 22. Using the present design, the blowing member 3 does not need to be provided with a plurality of air knives 31 along the moving direction of the roller 1. Only one or more air knives 31 are needed to be positioned along the axial direction of the roller 1. Exemplarily, the second platform portion 22 may move from the junction between the display portion 100A and the bonding portion 100B to the edge of the bonding portion 100B away from the side of the display portion 100A. The moving speed of the second platform portion 22 is synchronized with the moving speed of the roller 1, so that the positive airflow blown by the air knifes 31 can provide supporting force for the bonding portion 100B at the pressing position of the roller 1.

In summary, in the present disclosure, by providing with a plurality of blowing holes at the position of the platform corresponding to the bonding portion of the flexible panel, and connecting the blowing holes to the blowing member, the blowing member generate a positive pressure at the second gap via the blowing hole to support the bonding portion of the flexible panel, thereby solving a problem of formation of laminating bubbles caused by the step difference between the display portion and the bonding portion of the flexible panel and increasing product quality and process yield.

The embodiments of the present invention are described in detail above. Specific examples are used herein to illustrate the principles and implementation of the present disclosure. Descriptions of the above embodiments are only used for understanding the method and main ideas of the present disclosure. Meanwhile, for people skilled in the art, based on the idea of the present disclosure, will make changes in the specific implementation and the scope of application. In summary, the content of the present specification shall not be construed as limitation of the present disclosure.

What is claimed is:

1. A film laminating apparatus for laminating a flexible panel and a laminating film, the film laminating apparatus comprising:
   a roller;
   a platform arranged oppositely with respect to the roller;
   a blowing member positioned below the platform; and
   a detecting member;
   wherein the platform is configured to support the flexible panel and the laminating film, the platform comprises a first platform portion and a second platform portion positioned on a side of the first platform portion, the roller and the platform are separated by a first distance to form a first gap, the flexible panel and the laminating film are interposed between the roller and the platform via the first gap, and the laminating film is laminated on a surface of the flexible panel by rolling the roller;
   wherein the laminating film is disposed on a side of the flexible panel away from the platform, the flexible panel comprises a display portion and a bonding portion which is disposed on a side of the display portion, the display portion comes into contact with the platform and the bonding portion does not come into contact with the platform, and the bonding portion of the flexible panel and the platform are separated by a second distance to form a second gap; and
   wherein an air outlet of the blowing member is in communication with the second gap, and the blowing member is configured to generate a positive pressure at the second gap to support the bonding portion of the flexible panel; and
   wherein the display portion of the flexible panel is disposed with respect to the first platform portion, the bonding portion of the flexible panel is disposed with respect to the second platform portion, the detecting member is positioned at an edge of the first platform portion close to the second platform portion or the detecting member is positioned at a junction of the first platform portion and the second platform portion, and the detecting member is configured to detect whether the roller reaches a designated position.

2. The film laminating apparatus according to claim 1, wherein the platform is provided with a plurality of blowing holes at a position corresponding to the bonding portion, and the blowing holes are in communication with the air outlet of the blowing member.

3. The film laminating apparatus according to claim 2, wherein a plurality of the blowing holes are defined by the second platform portion and penetrate through the second platform portion.

4. The film laminating apparatus according to claim 3, wherein the roller is connected to a first driving member, and the first driving member is configured to drive the roller to roll along a direction from the first platform portion to the second platform portion.

5. The film laminating apparatus according to claim 4, wherein when the roller rolls to the bonding portion, the blowing member is configured to generate the positive pressure at the second gap, and a position of the air outlet of the blowing member is synchronized with a laminating position of the roller on the laminating film.

6. The film laminating apparatus according to claim 3, wherein a surface of the second platform portion facing the flexible panel is a first surface, the second platform portion comprises a platform body and a plurality of hollow areas, and each of the hollow areas is a corresponding one of the blowing holes; and
   wherein the blowing holes penetrate through the second platform portion in a direction perpendicular to the first surface, or the blowing holes penetrate through the second platform along a direction at a predetermined inclination angle relative to the first surface.

7. The film laminating apparatus according to claim 3, wherein a plurality of suction holes are defined on the first platform portion and penetrate through the first platform portion, and the film laminating apparatus further comprises:
   a plurality of suction members connected to the suction holes, wherein the suction members generate a negative pressure between the first platform portion and the display portion of the flexible panel via the suction holes, so as to suction the flexible panel on the first platform portion.

8. The film laminating apparatus according to claim 3, wherein the first platform portion and the second platform portion are an integral structure.

9. The film laminating apparatus according to claim 2, wherein a shape of the blowing holes may be a slit shape, and an extending direction of the slit is perpendicular to a moving direction of the roller.

10. The film laminating apparatus according to claim 1, wherein the detecting member is an infrared sensor and a direction of the emitted infrared light emitted by the infrared sensor is perpendicular to a surface of the first platform portion for contacting with the flexible panel.

11. The film laminating apparatus according to claim 10, wherein the first platform portion and the second platform portion are arranged independently of each other, and the second platform portion is movable relative to the first platform portion.

12. The film laminating apparatus according to claim 11, wherein the film laminating apparatus further comprises:
   a third driving member, wherein the second platform portion is connected to the third driving member, and the third driving member is used for driving the second platform portion to move,
   wherein the controller is further used for controlling the initiation and termination of the third driving member.

13. The film laminating apparatus according to claim 1, wherein the film laminating apparatus further comprises:
   a controller which controls initiation and termination of the first driving member and the blowing member,
   wherein when the detecting member detects that the roller reaches the designated position, the blowing member is initiated under control of the controller.

14. The film laminating apparatus according to claim 13, wherein the blowing holes are arranged at intervals along a rolling direction of the roller, and the blowing member comprises a plurality of air knives, and the air knives are positioned with respect to the blowing holes.

15. The film laminating apparatus according to claim 14, wherein when the detecting member detects that the roller reaches the designated position, the controller controls sequential initiation of the air knives along the rolling direction of the roller, and an initiation speed of the air knives is synchronized with a rolling speed of the roller.

16. The film laminating apparatus according to claim 13, wherein the second platform portion comprises a platform body, a hollow area, and a plurality of baffles, the baffles are positioned in the hollow area perpendicular to a rolling direction of the roller, and the baffles are rotatably connected to the platform body, and wherein adjacent pairs of the baffles are separated by a third distance to form a third gap which corresponds to the blowing holes, respectively.

17. The film laminating apparatus according to claim 16, wherein each of the baffles is rotatably connected to the platform body via a shaft, and the baffles rotate with the rotation of the shafts.

18. The film laminating apparatus according to claim 17, wherein the film laminating apparatus further comprises:
   a second driving member, wherein each of the shafts is connected with the second driving member, and the second driving member is used for controlling the rotation of each of the shafts,
   wherein the controller is further used for controlling the initiation and termination of the second driving member.

19. The film laminating apparatus according to claim 1, wherein a step difference between the display portion and the bonding portion of the flexible panel defines the second distance that forms the second gap between the bonding portion of the flexible panel and the platform.

* * * * *